United States Patent [19]

Weber

[11] Patent Number: 4,700,505
[45] Date of Patent: Oct. 20, 1987

[54] LINE RELEASE ON TROLLING DEVICE

[76] Inventor: Russell W. Weber, 6523 Sunnypoint Rd., Glendale, Wis. 53217

[21] Appl. No.: 873,601

[22] Filed: Jun. 11, 1986

[51] Int. Cl.$^4$ ............................................. A01K 91/00
[52] U.S. Cl. ................................... 43/43.12; 43/44.88
[58] Field of Search .............................. 43/43.12, 44.88

[56] References Cited

U.S. PATENT DOCUMENTS

| | | | |
|---|---|---|---|
| 1,033,464 | 7/1912 | Pomeroy | 43/43.12 |
| 2,733,537 | 2/1956 | Elsberg | 43/43.12 |
| 2,858,637 | 11/1958 | Stark | 43/43.12 |
| 3,081,575 | 3/1963 | Meisner | 43/43.12 |
| 3,115,696 | 12/1963 | Evans | 29/447 |
| 3,381,407 | 5/1968 | McDougall | 43/44.88 X |
| 3,930,330 | 1/1976 | Black | 43/43.12 X |
| 4,221,068 | 9/1980 | Roemer, Jr. | 43/43.12 |
| 4,395,841 | 8/1983 | Cudnohufsky | 43/43.12 |
| 4,513,524 | 4/1985 | Jolliff | 43/43.12 |
| 4,574,518 | 3/1986 | Shedd et al. | 43/43.12 |

Primary Examiner—M. Jordan
Assistant Examiner—Carmine Cuda
Attorney, Agent, or Firm—Arthur L. Nelson

[57] ABSTRACT

A fishing line release mechanism and a mounting device for trolling at a predetermined depth and releasing the fishing line when a fish strikes the bait. The release mechanism carries a resilient disc which supports the fishing line. The disc is mounted on a hinged member which latches with the release mechanism housing. The release mechanism includes an adjustment screw to control the amount of tension required to trigger the release.

16 Claims, 9 Drawing Figures

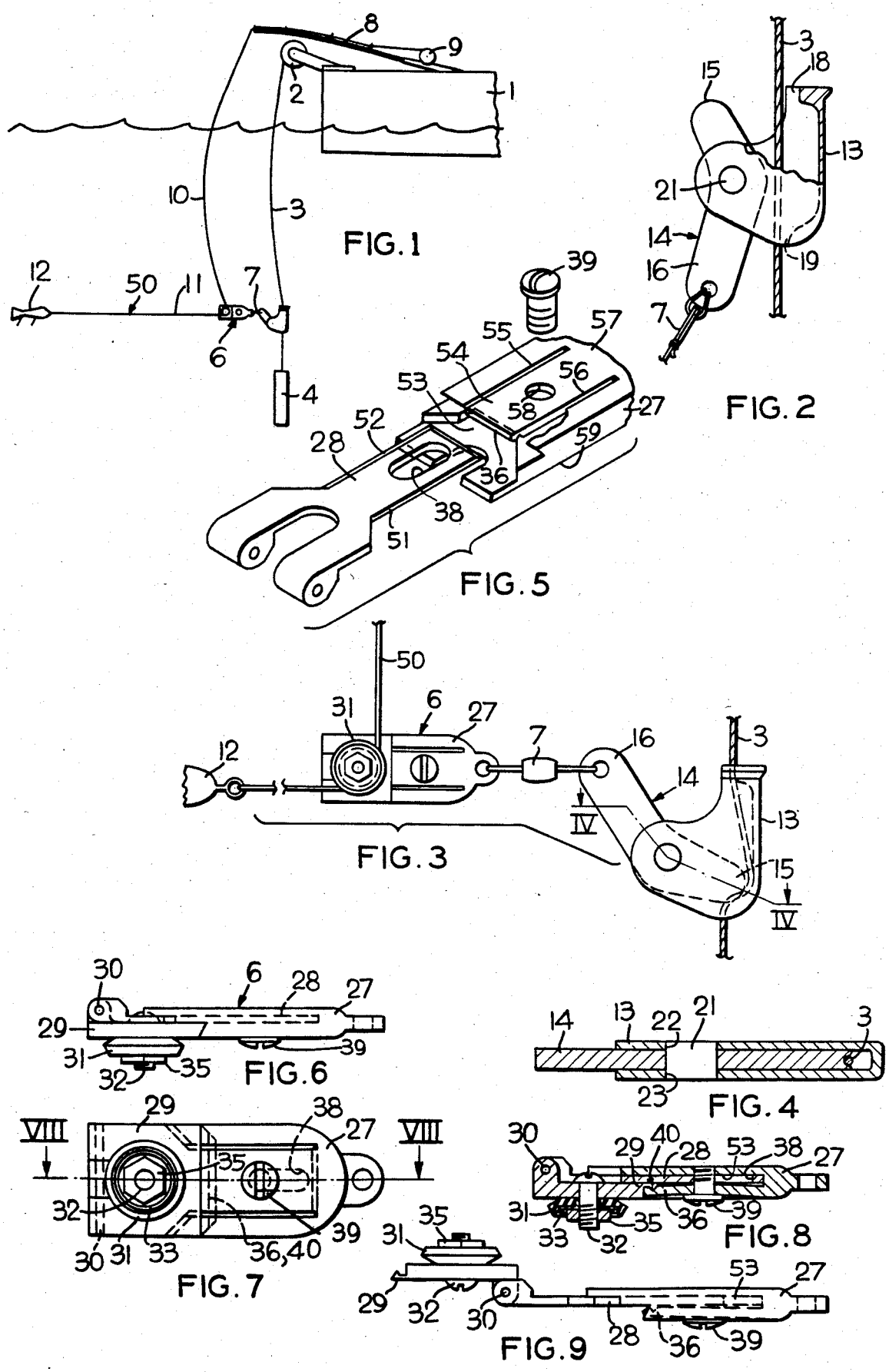

LINE RELEASE ON TROLLING DEVICE

This invention relates to fishing equipment consisting of a mounting device and more particularly a fishing line release mechanism used when trolling for fish. The line release has a latch mechanism operating responsive to the fishing line tension as a fish strikes the bait. A hinged member holding the line pivots 180° to release the fishing line. This causes the fishing rod to snap up signaling the fisherman that a fish has struck the lure.

Various types of devices are needed when fishing with a downrigger or outrigger. Essentially, a downrigger consists of a strong cable extending downwardly from the boat and a relatively heavy weight is connected to the bottom end of the cable. The weight is sufficiently heavy so that as the boat moves forwardly in a trolling operation the cable remains almost veritcal on account of the heavy weight. One or more fishing lines are each releasably attached to the cable at desired depths below the surface of the water. Each of these fishing lines extends downwardly from a rod and reel which is mounted on the rear of the boat. The fishing line is connected to a line release which is attached to the weight or mounted at the desired depth on the cable and is trolled through the water at this depth while the boat is in motion. The mounting device is provided with a means for positioning or stationing the line release at a predetermined level beneath the surface of the water. When a fish strikes the bait, the line releases from the line release and the control is then taken over by the rod and reel which is operated by the fisherman in the boat.

The Roemer patent, U.S. Pat. No. 4,221,068 and the Dusich patent, U.S. Pat. No. 4,069,611 show downrigger type of fishing. The Roemer patent shows a downrigger in which the cable extends downwardly into the water and a line release mechanism is fastened by means of a camming device onto the cable. The positioning on the cable is secured by moving a lever to operate a cam engaging the cable. The release mechanism consists essentially of a toggle carrying a forked lever which moves the toggle over center to release the line. The applicant's device does not use a toggle.

The Dusich patent shows a line release which can be positioned at a predetermined level on the cable for trolling. The release mechanism consists essentially of a pin or spool which is pivoted on one arm of a bifurcated member and fastened on the other arm through frictional means. The fishing line from the rod and reel extends downwardly and is wrapped around the pin several times and then it is snubbed against a frictional disc when in the operating position for trolling. When a predetermined tension is applied to the fishing line as the fish strikes, the pin is released from its seated position and the fishing line unwinds from the pin.

The applicant's invention does not use a pin as illustrated in the Dusich patent but rather it uses a pivoting latch member which is normally in the latched position. The latch member is hinged to a slide which is held in the retracted position in its normal trolling position. The fishing line is pulled under the edge of the resilient disc imbedding itself and holding the line in the trolling position. The latch member is held in a retracted position by a flexible member of the line release housing. A tension adjustment screw controls the amount of tension required to trigger or spring the latch. When sufficient tension is applied, the latched member is disengaged and slides rearward while pivoting 180°. This frees the line and allows it to be pulled out from under the disc for controlling fishing from the rod and reel. Accordingly, the applicant's invention employs a different device and operates in a different manner from that shown in these two references.

It is an object of this invention to provide a fishing line release mechanism and a mounting device.

It is a further object of this invention to provide a mounting device and a fishing line release mounted on a cable to provide selective depth control for trolling of the fishing line. A hinged latch member on the fishing line release releases the fishing line responsive to predetermined line tension as a fish strikes the bait. This frees the fishing line for control by the fisherman through the rod and reel.

The objects of this invention are accomplished by providing a mounting or stacking device on a down cable with a camming means positioning the line release at a predetermined level on the cable. The fishing line extends downwardly from the rod and reel to the line release. The line release is connected to the mounting device and is provided with a latch member which is pivotally supported on a slide which reciprocates fore and aft in a slideway of the release housing. The fishing line is imbedded under the resilient disc on the latch member and in the latched position holds the fishing line at the desired level. When a predetermined tension is applied to the fishing line such as a strike of a fish it causes the slide to move in the direction of the pull unlatching the latch member and pivoting the latch member 180°. This allows the fishing line to release from under the resilient disc and control of the fishing line is then from the rod and reel. The mounting device and the line release remain on the cable and are returned for resetting and the fishing line is again fastened and lowered to the predetermined fishing level.

Referring to the drawings,

FIG. 1 is a schematic view of the downrigger and fishing equipment mounted on a boat in the trolling position.

FIG. 2 shows the mounting device on the cable with the cam on the lever in the open or disengaged position.

FIG. 3 illustrates the fishing line attached to the fishing line release in the trolling position. The mounting device is secured to the cable by the camming means to maintain the predetermined depth.

FIG. 4 illustrates a cross section view of the mounting device taken on line IV—IV of FIG. 3.

FIG. 5 is an exploded view of the line release mechanism showing the slide and slideway.

FIG. 6 is a plan view of the fishing line release mechanism.

FIG. 7 is a side elevation view of the fishing line release mechanism.

FIG. 8 is a cross section view of of the fishing line release taken on line VIII—VIII of FIG. 7.

FIG. 9 is a plan view of the fishing line release in the extended position for releasing the fishing line.

FIG. 1 is a schematic illustration of the downrigger and rod and reel operated from a boat 1. The windlass 2 supports the cable 3 which is fastened to a weight 4 on its lower end. The weight keeps the cable in essentially a vertical position even though the boat is traveling forwardly. The mounting device and line release are secured to the cable. The fishing line is attached to the line release and the cable is lowered to a predetermined depth below the surface of the water. The line release 6 is connected to the mounting device by a connector 7 including a swivel. A modification of connector 7 includes resilient means. The rod 8 and reel 9 are mounted in a suitable holder on the boat and the portion 10 of fishing line 50 extends downwardly to the line release 6 and then rearwardly through portion 11 to the bait 12.

FIG. 2 illustrates the cable 3 extending through the casing 13 which supports the lever 14. The lever 14 is essentially a bell crank with a cam end 15 and a lever arm 16 which is attached to the connector 7. FIG. 2 shows the mounting device in the open position in which the cam 15 is rearwardly of the cable guides 18 and 19.

FIG. 3 illustrates the trolling position with the mounting device in the locked position in which the lever arm 16 of the lever 14 is pivoted upwardly and the cam 15 bears against the cable to lock the cable in a fixed position relative to the casing 13 in the mounting device. The mounting device is held in this position which establishes the depth and the plane in which the fishing is being done.

The fishing line holder and release 6 extends rearwardly from the connector 7. The fishing line 50 extends downwardly to the line release and is held under disc 31 and then extends rearwardly to the bait 12.

FIG. 4 is a cross-section view showing the lever 14 in the casing 13 and the pivot pin 21 extending through the openings 22 and 23 of the casing 13.

FIG. 5 illustrates the housing 27 of the line release 6 in an exploded view with the slide 28. Slide 28 is formed with beveled edges 51 and 52 and is received in slideway 53 formed by the housing 27. Side wall 54 is formed with slits 55 and 56 and fastened to the housing at end 57. Screw 39 extends through opening 58 and is threaded to the opposite side wall 59. Adjusting screw 39 tensions the latch element 36 of latch 40. Screw 39 provides an adjustment for tensioning of the latch which consists of the latch element 36 and the latch member 29.

FIG. 6 illustrates a plan view of the line release 6. Line release 6 includes the housing 27 which receives the slide 28 in slideway 53. Slide 28 is hinged to the latched member 29 by the hinge pin 30. The line release includes a disc 31 constructed of a resilient material such as rubber for holding the fishing line. A screw 32, washer 33, and nut 35 fastened the disc 31 in a compressed position for holding the fishing line.

FIG. 7 shows the side elevation view of the line release 6 showing the disc 31 fastened by the washer 33 and screw 32 and nut 35. The slide 28 defines slot 38 which limits the reciprocating movement of the slide 28 in the housing 27. The FIG. 7 shows the latching mechanism in the retracted and latched position.

FIG. 8 shows the housing 27 and the slide 28 in the retracted and latched position. The adjusting screw 39 is shown tensioning the latch element 36 where it engages the latch member 29 of latch 40. This provides a means for adjusting the tension for releasing the latch. This controls the tension of fishing line 11 which releases the latch and allows the latch member 29 to move to the position in FIG. 9.

FIG. 9 shows the latch member 29 in the extended and unlatched position and the position of the fishing line holding disc 31 in a reverse position to that shown in FIGS. 6 and 8.

When a fish strikes the bait 12 it increases tension to a predetermined value which releases the latch 40 causing the latch member 29 to pivot rearwardly as shown in FIG. 9. In this position the fishing line is released from the disc 31 and the line is then free to be controlled by the rod and reel 8 and 9. The cable 3 and weight 4 remain in this position.

The embodiments of the invention in which an exclusive property or privilege is claimed are defined as follows:

1. A mounting device and line release mechanism for trolling comprising, a mounting device for positioning on a cable, said release mechanism connected to said mounting device and comprising, a housing defining a slideway, a slide reciprocably received in said slideway, a latch member pivotally connected to said slide and defining a lateral surface, a latch element defined by said housing for engaging said latch member in a latched position when said slide is in a retracted forward position, a fishing line retainer disc having a mating lateral surface engaging the lateral surface on said latch member for holding the fishing line between said surfaces, said latch member moving from said latch element and pivoting rearwardly to an extended position allowing releasing of said fishing line from between said surfaces when a predetermined tension is applied to the fishing line.

2. A mounting device and line release mechanism comprising, a mounting device for selective positioning on a cable, said line release mechanism including a housing connected to said mounting device and defining a slideway and a latch element, a slide reciprocably mounted in said slideway, a latch member hinged to said slide for pivoting between a latched and retracted forward position and an unlatched and extended rearward position, a fishline retainer forming an interface with said latch member for frictionally holding a fishing line on the forward portion of the interface, said latch member unlatching from said latch element and pivoting rearwardly to an extended position in response to a predetermined tension on the fishing line and allowing the fishing line to release rearwardly from the interface.

3. A fishing line release mechanism comprising, a latch and a housing, said housing defining a slideway, a slide reciprocably received in said slideway, a latch member hinged to said slide, said latch member movable from a latched and retracted forward position to an unlatched and extended rearward position, a fishing line retainer forming an interface and fastened on said latch member by a fastening means for releasably retaining the fishing line at the interface forward of said fastening means, said latch member moving from the latched position pivoting rearwardly to an unlatched and extended position responsive to a predetermined tension on the fishing line and allowing release of said fishing line rearwardly from the interface and rearwardly of said fastening means.

4. A mounting device and fishing line release mechanism as set forth in claim 1 including an adjusting means on said fishing line release for adjustably controlling the tension of the unlatching of said latch member with said latched element.

5. A mounting device and fishing line release mechanism as set forth in claim 1 including an adjustable latch release and a resilient disc for retaining said fishing line.

6. A mounting device and fishing line release mechanism as set forth in claim 2 including means on said slide for determining the limits of retraction and extension of said slide and said latch member.

7. A mounting device and fishing line release mechanism as set forth in claim 2 including a resilient disc forming said retainer for holding said fishing line.

8. A mounting device and fishing line release mechanism as set forth in claim 2 including a swiveled connetion between said housing of said line release and said mounting device.

9. A mounting device and line release mechanism as set forth in claim 2 wherein said mounting device includes a casing, a cam means in said casing for fixing the position of said mounting device on said cable.

10. A mounting device and fishing line release mechanism as set forth in claim 2 including a resilient connection between said housing and said mounting device.

11. A mounting device and fishing line release mechanism as set forth in claim 2 wherein said slide and said slideway define mating beveled edges.

12. A mounting device and fishing line release mechanism as set forth in claim 2 wherein said fishing line holder and release includes a resilient disc for holding said fishing line, wherein said fishing line contacts said disc for an arc of approximately 270°.

13. A mounting device and fishing line release mechanism as set forth in claim 2 wherein said latch member defines a pivotal axis with said slide and said latch member pivots 180° to release said fishing line when said latch is unlatched.

14. A mounting device and fishing line release mechanism as set forth in claim 2 wherein said fishing line release includes a resilient disc and said latch member pivots approximately 180° allowing said line to release from said disc.

15. A mounting device and fishing line release mechanism as set forth in claim 1 including a disc on said line release, an adjustable screw adjustably setting the retaining compression of said disc on said latch member to control the retension of said fishing line on said latch member.

16. A mounting device and fishing line release mechanism as set forth in claim 1 wherein said device is constructed of a plastic material.

* * * * *